Patented Feb. 7, 1950

2,497,035

UNITED STATES PATENT OFFICE 2,497,035

PROCESS OF PREPARING C-VITAMINIZED BAKING PRODUCTS

Wilhelm Adolf Seeder, Zaandam, Netherlands

No Drawing. Application August 25, 1945, Serial No. 612,727. In the Netherlands May 31, 1943

Section 1, Public Law 690, August 8, 1946
Patent expires May 31, 1963

3 Claims. (Cl. 99—11)

The growth and the maintenance of the human organism require vitamins, amongst others, vitamin C, but not by a long way does the food consumed in all cases contain a sufficient proportion thereof. Hence, it was obvious to try to supply the human organism with the said vitamin by incorporating it with foodstuffs taken by everybody, in particular with bread. This latter attempt, however, has failed because vitamin C is relatively unstable and is destroyed entirely or nearly entirely in preparing bread. Thus, Falke and Lemmel state in "Ernährung," part IV (November 1939), page 321, that though ascorbic acid has practically unlimited stability in dry flour, about 90% of it is decomposed in baking bread and rolls. Even an attempt to obviate this disadvantage by introducing carbon dioxide into the oven during baking has not produced the desired result. Consequently, all efforts to provide the human organism with vitamin C in this manner had to be given up. As a matter of fact, it has also been proposed to incorporate ascorbic acid with flour, in order to improve the baking properties of the latter. This proportion of ascorbic acid however, is necessarily so small that after baking, the baking product is not found to contain it. This has been demonstrated by using 2.6-dichloro-phenol-indophenol as a reagent to test the baked product and comparing it with a like "blank" test of a baked product prepared in the same way but without the ascorbic acid.

Surprisingly, it has been found that when ascorbic acid is added in preparing dry baking products, it is destroyed during baking only to a relatively small extent and that the resulting dry baking products still contain about 70–95% of the said substance in active form. It has also been found that the ascorbic acid content of the said baking products practically does not decrease when they are stored in their natural ways. The dry baking products according to the invention are obtained by incorporating ascorbic acid with the usual dough or with one or more of the usual ingredients for the dough, for instance with the water, and subsequently baking the dough, if necessary after further preparation. Instead of pure ascorbic acid, substances containing it in a sufficient amount, such as suitable concentrates, for example of vegetable juices, may also be used. The addition of natural, consequently of not concentrated, vegetable juices does not lead to vitaminised dry baking products in the sense of the invention as defined below. For example, even if all the water used in the compositions for making the dry baking products is substituted by lemon-juice the product after baking turns out not to contain vitamin C.

"Dry" in the sense of the invention are the products which in fresh condition, as soon as they are ready for consumption, do not contain more than about 12% of moisture at the utmost. Preferably, however, the moisture content should be less than 8%. Examples of dry baking products are rusks, wafers, dry cakelets, and in particular dry biscuits such as crackers or the like. Dependent on their destination, the baking products may contain rather diverging proportions of ascorbic acid. They must, however, clearly show a content of ascorbic acid or in other words the ascorbic acid reaction; said reaction occurs in the sense of the invention, when the products after being baked contain 10 mg. of ascorbic acid at least per 100 grams of the fresh dry baking products. Of course, other reducing substances (such as reductone) should not be mistaken for vitamin C; hence it is preferable to carry out a blank test as stated above.

The invention permits of dosing the supply of vitamin C to the human body in an ideal manner, since the baking products according to it have a constant vitamin C content, in contra-distinction with natural foodstuffs containing this vitamin, such as oranges, potatoes, etc. Moreover, the former are a palatable dainty; especially biscuits can be taken by everybody, even by babies.

Naturally, apart from vitamin C, still other substances the presence of which in foodstuffs is desirable, such as other vitamins, may be added. It may also be tried to limit the relatively small loss of vitamin C in kneading the dough and in baking. For this purpose may be used, for instance, substances which counteract the oxidation of ascorbic acid, such as meta-phosphoric acid or salts of it, glucose, disodium phosphates, etc. The products may also be baked in an inert gas atmosphere. However, as appears from the data stated above, these measures are not necessary.

Example

Biscuits are baked from a dough, consisting of:

| | Grams |
|---|---|
| Flour | 330 |
| Powdered sugar | 55 |
| Skim milk | 17 |
| Butter | 10 |
| Skim milk powder | 3.3 |
| Ammonium bicarbonate | 4.8 |
| Salt | 0.7 |
| Hydrochloric acid | 0.2 |
| Ascorbic acid | 1.8 |
| Glucose | 5 |
| Water | 74 |

After baking, the finished product still contained 94% of the ascorbic acid added, in the determination of which the reductone content has been taken into account by means of a blank test; after 10 weeks this percentage had not yet decreased.

What I claim is:

1. A process of producing baked food products enriched in vitamin C for human nutrition, wherein a dough predominantly of cereal flour is prepared and baked to obtain the products, which comprises incorporating water into the dough in a limited amount such that the baked products contain not more than 12% of moisture by weight, incorporating ascorbic acid in concentrated form uniformly into the dough in an amount exceeding 10 mg. per 100 grams of dough, and baking the prepared dough to obtain dry baked products containing in a stable state at least 10 mg. of ascorbic acid per 100 grams of product.

2. A process as described in claim 1 wherein the ascorbic acid is incorporated as substantially pure ascorbic acid.

3. A process as described in claim 1 wherein the ascorbic acid is incorporated as a concentrate of a vegetable juice containing ascorbic acid.

WILHELM ADOLF SEEDER.

REFERENCES CITED

The following references are of record in the file of this patent:

UNITED STATES PATENTS

| Number | Name | Date |
|---|---|---|
| 1,474,746 | Ward | Nov. 20, 1923 |
| 2,149,682 | Jorgensen | Mar. 7, 1939 |
| 2,300,439 | Van der Lee | Nov. 3, 1942 |

FOREIGN PATENTS

| Number | Country | Date |
|---|---|---|
| 503,476 | Great Britain | Mar. 30, 1939 |
| 133,183 | Great Britain | Oct. 9, 1919 |
| 455,221 | Great Britain | Oct. 12, 1936 |
| 290 | Great Britain | of 1868 |
| 404,144 | Great Britain | Jan. 11, 1934 |

OTHER REFERENCES

Ser. No. 285,437, Reineer (A. P. C.), published June 1, 1943.